Nov. 25, 1941.  C. L. EKSERGIAN  2,263,945

BRAKE MECHANISM

Filed Jan. 15, 1940

INVENTOR
Carolus L. Eksergian
BY John P. Barber
ATTORNEY

Patented Nov. 25, 1941

2,263,945

UNITED STATES PATENT OFFICE 2,263,945

BRAKE MECHANISM

Carolus L. Eksergian, Detroit, Mich., assignor to Budd Wheel Company, Philadelphia, Pa., a corporation of Pennsylvania Application January 15, 1940, Serial No. 313,854

10 Claims. (Cl. 188—153)

The present invention relates to brakes.

More particularly, it concerns brakes of the so-called disk type, wherein the braking is provided by rings or disks rotating with the wheels and having cooperating relatively stationary brake shoes, co-acting with the side faces of the disks to provide the braking effort.

An object of the invention is to provide a multiple type of brake, wherein a plurality of brake disks is mounted to rotate with each wheel, and wherein suitable brake shoes are forced simultaneously against such disks, preferably by a single brake cylinder having two oppositely moving pistons therein.

More specifically, the invention in one form contemplates providing means co-acting with a vehicle wheel for supporting a plurality of brake disks in such way that they may slide axially of the wheel to a limited extent, while being constrained to rotate positively with the wheel, in combination with means for supporting a corresponding number of brake shoes which are substantially stationary with respect to the disks, but have a limited degree of motion parallel to the axis of the wheel, said brake shoes normally being maintained out of contact with said brake disks, but being capable of being forced into engagement therewith by means of a piston or pistons, movable in a direction parallel to the wheel axis, whereby such piston will not only force the brake shoes against the brake disks but will also cause the brake disks themselves to move axially to the proper positions to provide equalized braking action on all the disks.

Other objects and advantages of the invention will be in part particularly pointed out in the present specification and accompanying drawing, and in part will be obvious from the said disclosure itself.

Figure 1:
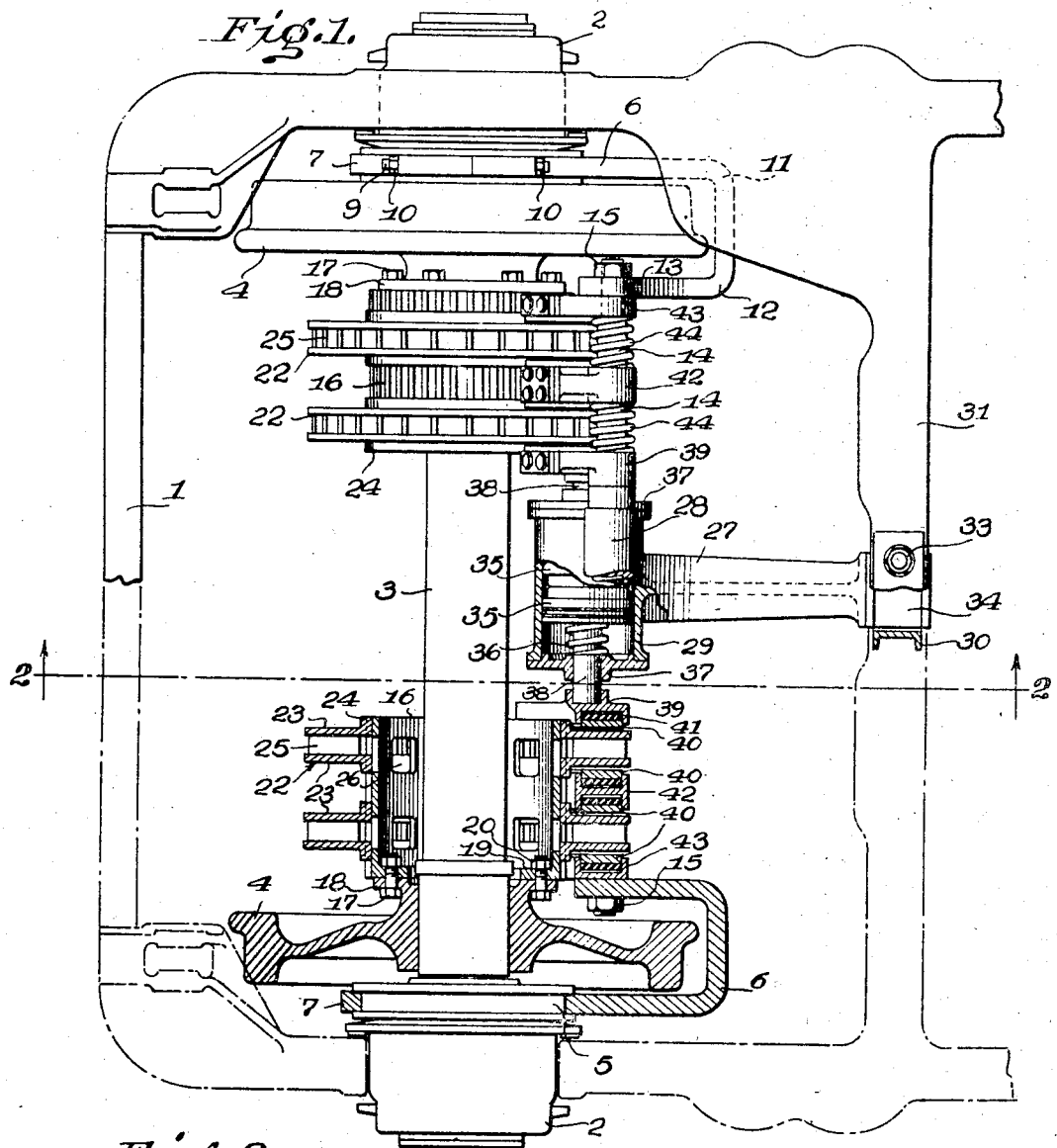
Figure 2:
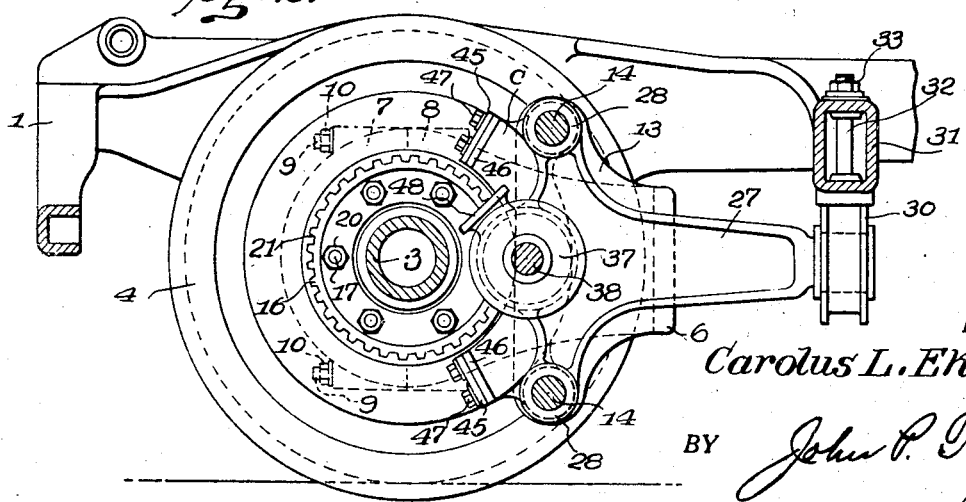

In said drawing, which illustrates a preferred embodiment of the invention,

Fig. 1 is a diagrammatic partly sectional plan view of a fragmentary portion of a truck. showing the invention; and Fig. 2 is a corresponding elevation, partly in section on the plane indicated by the line 2—2 of Fig. 1.

In both figures similar elements are designated by corresponding reference characters.

In the embodiment selected for illustration, I designates the frame which rests on the journal boxes 2, wherein is journaled the axle 3 carrying the wheels 4. While the wheels are here shown as mounted on a live axle, it is obvious that the invention is equally applicable to wheels which rotate independently of one another, or independently of the axle, and therefore the invention is not to be limited to any particular type of wheel and axle construction.

Each journal box 2 may have a grooved portion 5 at its inner end, to provide a concentric mounting for a brake holding arm or yoke 6, which is supported pivotally within the groove by means of the separable cooperating portions 7 and 8 of the brake yoke which are held together by the studs 9 and nuts 10, so as to make it possible to remove the entire brake actuating assembly by removing certain of the nuts 10.

It will be noted that the yoke 6 is built of sufficient strength and rigidity to serve the purpose of holding the brake shoes in proper position in service. The yoke 6 is bent inwardly as shown at 11 to clear the wheel 4, and then is bent toward the axle 3 as shown at 12, terminating in a widened portion 13.

Two rods 14 extend from the widened part 13 of one brake yoke 6 to that of the other, and are secured thereto by the nuts 15. These rods form supports and guide members for the brake shoes, as will be described hereinafter.

A drum 16 is secured to each wheel, this being accomplished in the present instance by means of bolts 17 passing through the hub flange 18 of the wheel and through an inwardly directed flange 19 of each drum, with suitable nuts 20 screwed on the ends of said bolts.

Each drum 16 preferably has a plurality of ribs or keys 21 on its outer surface, these keys extending in a direction substantially parallel to the wheel axis, that is, the outer surface of the drum somewhat resembles the teeth of a long spur gear.

Upon these keys or ribs slide a plurality of brake rings or disks 22, each such brake ring having two braking surfaces 23, and having preferably a widened portion at its base as shown at 24, to provide a firm hold on the keys of the drum and to assist in accurately positioning the brake rings, so as to be truly radial with respect to the axle, while freely slidable along the respective drums.

Each brake ring preferably consists of two parallel flanges, providing the braking surfaces 23, said flanges being connected and braced with respect to one another by the cooling vanes 25. In order to provide passages for air between said vanes, a plurality of openings 26 may be provided in each drum, these openings being large enough to be in communication with the open central portions of the brake rings, throughout their range of lateral motion on the drums.

Cooperating with the disks, there is provided a rearwardly extending arm 27 which has a widened portion terminating in two lugs 28, which are bored to receive the rods 14. The element 27 also carries the fluid pressure cylinder 29, which may if desired be formed integrally therewith. The rear portion of the arm 27 may be engaged in a hanger or yoke 30, supported from a cross brace 31 of the frame 1, as by the screw-threaded rods 32 and nuts 33. A certain amount of play may be provided between the end 34 of the arm 27 and the aperture in the yoke 30, and a resilient lining may also be provided between these parts if desired, so that the arm 27 will be free to adjust itself into proper alinement in service, even when warping or twisting of the truck frame occurs.

Within the cylinder 29 are two oppositely movable pistons 35, provision being made for introducing a pressure medium, such as compressed air or the like at the middle of the cylinder, through the spud 48, to force the pistons apart when the brakes are to be applied. Restoring springs 36 will also be provided, bearing between the outer face of each piston 35 on the one hand, and the inside of the corresponding cylinder head 37 on the other hand. Each piston has a rod 38 attached thereto, and these rods act on the inner ends of the two innermost brake shoe carriers 39.

It will be noted that the said carriers 39 may be provided each with a single arcuate element 40 constituting the brake shoe proper, adapted to be forced against one of the surfaces 23 of a brake disk, and a backing 41 for the brake shoe, which may be of yieldable or resilient material, for example, rubber, felt, or other suitable fibrous and/or elastic material, or they may be and preferably are, provided as in my copending application S. N. 198,627 filed March 29, 1938, now Patent No. 2,236,311, issued March 25, 1941, with a plurality of spaced brake block elements individually backed by rubber or the like.

The central brake shoe carrier 42, of each group, on the other hand has two brake shoes 40 therein, facing in opposite directions, while the outermost carrier 43, like the innermost, has only a single brake shoe, which however faces in the opposite direction.

It will be understood, of course, that the brake shoe carriers are duplicated on the opposite sides of the longitudinal center line of the truck frame, and it will also be understood that while two brake disks and three brake shoe carriers have been disclosed, this number may be varied to suit the operating conditions. Interposed between successive carriers, are the springs 44, which urge said carriers to separate from each other and from the brake rings when not acted on by the piston rods 38.

The brake shoe carriers illustrated consist of relatively shallow arcuate channels, which are closed at their ends by end closures 45 secured to flanges 46, by any suitable means, such as the cap screws 47 or as disclosed in said copending application above referred to.

The operation of the invention is the following:

When there is no air pressure in the brake cylinder 29, the springs 36 will force the pistons inwardly within said cylinder, and at the same time the springs 44 will tend to separate the brake shoe carriers 39, 42 and 43, by moving them along the rods 14, upon which they slide. Thus the brake disks 22 will also be shifted thereby along the keys on the drum 16, and will be disengaged from the brake shoes bearing against their side faces, so that at such time no braking effort will be produced and the brake rings will revolve freely and substantially out of contact with the cooperating brake shoes, thereby minimizing the wear thereof.

However, when air pressure forces the pistons 35 away from one another, the entire group of cooperating structures consisting of the brake disks and the brake shoes and their carriers will be forced outward and into braking contact upon their adjacent surfaces, whereby equalized braking forces will be produced. Obviously, the braking force may be increased to any desired extent, within reasonable limits, by increasing the number of cooperating disks and brake shoes, so that a relatively large braking force may be provided within the very limited space usually available.

The yokes or hangers 6 will adjust themselves to guide the brake shoe carriers and their actuating means pivotally about the axis of each axle 3, and the entire brake applying assembly will be prevented from rotating about said axis by reason of the yoke 30, which engages the rear end 34 of the arm 27, however, in such way that sufficient yieldability and play are available to prevent undue strains or injury in case any twisting action is produced in service.

The brakes will be kept cool by the centrifugal currents of air passing out between the vanes 25, and entering through the openings 26 in the drum 16.

While the present invention has been described in connection with a specific embodiment thereof, which at present is believed to be the preferred form, it is clear that the same is not limited to any specific structure, and that it may be varied in many details without sacrificing any or all of its various advantages.

The scope of the invention is therefore defined solely in the following claims:

1. A brake mechanism comprising a rotary element, a drum attached thereto, said drum having a guideway thereon extending substantially parallel to the axis of rotation, a brake ring movable along said guideway but constrained to rotate with the drum, said brake ring consisting of two spaced annular members connected by vanes, said drum having openings to provide air passages continuous with those between said vanes, a brake shoe relatively stationary with respect to the rotary element, and means for moving said brake ring axially of the drum to bring it into braking contact with the said brake shoe at will, while maintaining open passage for cooling air through the drum and between the vanes.

2. A brake mechanism comprising two spaced substantially coaxial rotary elements, a drum attached to each, each drum having a guideway thereon extending substantially parallel to the axis of rotation, a brake ring directly mounted on said drum, movable along said guideway but constrained to rotate with each drum, two brake shoes relatively stationary with respect to the brake rings and outside the latter, a brake shoe inside each ring, said shoes being restrained from rotation but shiftable in a direction substantially parallel with the axis, each ring thus having a shoe on each side thereof, and a single fluid pressure actuated means for moving said shiftable brake shoe of each group toward the corresponding stationary brake shoe, thereby also moving the brake rings axially of the drum to bring their opposite faces into braking contact with the said respective brake shoes at will.

3. A brake mechanism comprising two spaced substantially coaxial rotary elements, a drum attached to each, each drum having a guideway thereon extending substantially parallel to the axis of rotation, a brake ring directly carried by each drum and movable along said guideway but constrained to rotate with the drum, two brake shoes relatively stationary with respect to the brake rings and outside the latter, two outwardly movable brake shoes respectively inside the rings and means comprising a single cylinder with two oppositely moving pistons therein for moving said last named brake shoes simultaneously in opposite directions axially of the drum to bring each ring into braking contact with the said respective brake shoes at will.

4. A brake mechanism comprising two spaced substantially coaxial rotary elements, a drum attached to each, each drum having a guideway thereon extending substantially parallel to the axis of rotation, a brake ring directly carried by each drum and movable along said guideway but constrained to rotate with the drum, two brake shoes relatively stationary with respect to the brake rings and outside the latter, two outwardly movable brake shoes respectively inside the rings, means comprising a single cylinder with two fluid-pressure actuated oppositely moving pistons therein for moving said last named brake shoes outward simultaneously in opposite directions axially of the drum to bring each ring into braking contact with the said respective brake shoes at will, and means for restoring all said parts to their initial positions when the fluid-pressure ceases to act on the pistons.

5. A wheel truck having a frame, a wheel and axle assembly supporting said frame, the opposed wheels of said wheel and axle assembly each having secured thereto to rotate therewith a rotary braking member, a stationary segmental brake member associated with the rotary braking member of each wheel and a single common brake cylinder disposed on a line between the centers of the opposed stationary brake members for actuating them, by direct thrust upon the stationary brake members, into braking engagement with the respective rotary members.

6. A wheel truck having a frame, a wheel and axle assembly supporting said frame, the opposed wheels of said wheel and axle assembly each having secured thereto to rotate therewith a rotary braking member, a stationary segmental brake member associated with the rotary braking member of each wheel, a single common brake cylinder for actuating said stationary brake members into engagement with the respective rotary members, said cylinder and the stationary brake members being carried by the wheel and axle assembly and frame and the cylinder being disposed in direct line between the central portions of the opposed stationary members, whereby the said stationary members are actuated by a direct thrust action from the cylinder.

7. In combination, a truck frame, a wheel and axle assembly supporting said frame, each of the wheels of said assembly having secured thereto for rotation therewith a rotary braking member, stationary segmental braking members for cooperation with the rotary members, and supporting and actuating means for said stationary brake members comprising a pair of yokes, each straddling a wheel of said assembly and having its outer arm mounted on the axle of said assembly, the inner arms of said yokes being interconnected by a plurality of rods and a single brake cylinder common to said stationary brake members for actuating them also supported on said rods and having an extension engaging the truck frame to take the braking torque.

8. The combination according to claim 7, in which the brake cylinder has means affording direct thrust engagement with the stationary braking members for actuating them.

9. The combination according to claim 7, in which the stationary braking members are slidably mounted on the rods and the cylinder is fixedly secured thereto centrally thereof.

10. A brake mechanism comprising a rotary element, a drum attached thereto, said drum having a guideway thereon extending substantially parallel to the axis of rotation, a brake ring movable along said guideway but constrained to rotate with the drum, said brake ring consisting of two spaced annular members connected by vanes, said drum having openings to provide air passages continuous with those between the vanes, a brake shoe relatively stationary with respect to the rotary element, and means for moving said ring and shoe axially into braking engagement at will, while maintaining open passage for cooling air through the drum and between the vanes.

CAROLUS L. EKSERGIAN.